United States Patent
Pho (10) Patent No.: US 9,218,293 B2
(45) Date of Patent: Dec. 22, 2015

(54) DATA PROCESSING SYSTEM WITH CACHE LINEFILL BUFFER AND METHOD OF OPERATION

(71) Applicant: Quyen Pho, Pflugerville, TX (US)

(72) Inventor: Quyen Pho, Pflugerville, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 297 days.

(21) Appl. No.: 14/041,910

(22) Filed: Sep. 30, 2013

(65) Prior Publication Data

US 2015/0095583 A1    Apr. 2, 2015

(51) Int. Cl.
    *G06F 3/00*     (2006.01)
    *G06F 12/00*    (2006.01)
    *G06F 12/08*    (2006.01)

(52) U.S. Cl.
    CPC ........ *G06F 12/0891* (2013.01); *G06F 12/0855* (2013.01)

(58) Field of Classification Search
    None
    See application file for complete search history.

(56) References Cited

U.S. PATENT DOCUMENTS

| 7,228,362 | B2  |   | 6/2007 | Jen et al. |
| 7,552,285 | B2  | * | 6/2009 | Begon ................. G06F 12/0859 711/118 |
| 2008/0059705 | A1 |   | 3/2008 | Begon et al. |
| 2012/0166694 | A1 | * | 6/2012 | Dosh ................... G06F 13/4234 710/110 |

* cited by examiner

*Primary Examiner* — Idriss N Alrobaye
*Assistant Examiner* — Richard B Franklin (57) ABSTRACT

When data in first and second requests from a processor does not reside in cache memory, a first data element responsive to the second request is received by a cache controller from an external memory module after a first data element responsive to the first request and before the second data element responsive to the first request. Ownership of a linefill buffer is assigned to the first request when the first data element responsive to the first request is received. Ownership of the linefill buffer is re-assigned to the second request when the first data element responsive to the second request is received after the first data element responsive to the first request is received.

20 Claims, 3 Drawing Sheets

CPU REQUESTS 2 CRITICAL ACCESSES OF 2 DIFFERENT CACHE LINES, IN ORDER.

| | | |
|---|---|---|
| T0) | CPU REQUESTS TO CACHE CONTROLLER | A0, B0 |
| T1) | CACHE CONTROLLER REQUESTS TO BUS | A0 BURST, B0 BURST (IN-ORDER ID) |
| T2) | BUS RESPONDS TO CACHE CONTROLLER | A0, A1, A2, A3, <STALL> B0, B1, B2, B3 |
| T3) | CACHE CONTROLLER RESPONDS TO CPU | A0, ← STALLS → , B0 |
| T4) | CACHE OPERATION | CACHE LINE A. CACHE LINE B. |

FIG. 3

OUT-OF-ORDER REQUESTS. CRITICAL BEATS RETURNED OUT-OF-ORDER BUT NO INTERLEAVING FOR NON-CRITICAL BEATS.

| | | |
|---|---|---|
| T0) | CPU REQUESTS TO CACHE CONTROLLER | A0, B0 |
| T1) | CACHE CONTROLLER REQUESTS TO BUS | A0 BURST, B0 BURST (OUT-ORDER IDs) |
| T2) | BUS RESPONDS TO CACHE CONTROLLER | A0, B0, A1, A2, A3, B1, B2, B3 |
| T3) | CACHE RESPONDS TO CPU | A0, B0 |
| T4) | CACHE OPERATION | ABORT LINE A. CACHE LINE B. |

FIG. 4

OUT-OF-ORDER REQUESTS. CRITICAL BEATS RETURNED OUT-OF-ORDER BUT NO INTERLEAVING FOR NON-CRITICAL BEATS.

| | | |
|---|---|---|
| T0) | CPU REQUESTS TO CACHE CONTROLLER | A0, B0 |
| T1) | CACHE CONTROLLER REQUESTS TO BUS | A0 BURST, B0 BURST (OUT-ORDER IDs) |
| T2) | BUS RESPONDS TO CACHE CONTROLLER | B0, B1, B2, B3, A0, A1, A2, A3 |
| T3) | CACHE RESPONDS TO CPU | A0, B0 |
| T4) | CACHE OPERATION | CACHE LINE B. CACHE LINE A. |

FIG. 5

DATA PROCESSING SYSTEM WITH CACHE LINEFILL BUFFER AND METHOD OF OPERATION

BACKGROUND

1. Field

This disclosure relates generally to data processing systems, and more specifically, to a data processing system with a cache linefill buffer.

2. Related Art

Cache memories are typically used within data processing systems in order to reduce memory access times. Caches are smaller, faster memories used to store copies of data which reside in the slower memory. Since caches are typically much faster to access than the memory, it is desirable to store data which resides at more frequently accessed memory locations within the cache. If a read memory access request (i.e. a load access request) is made to a cache, and the access address of the read access request is stored in the cache, a cache hit occurs and the read data can be provided from the cache rather than having to access the slower memory. This prevents the extra latency introduced from having to access the slower memory to respond to the access request. However, if the read memory access request is not stored in the cache, a cache miss occurs and the read request is made to the memory to retrieve the read data. The read data can also be stored into the cache so that, if subsequently accessed, a cache hit will occur. Furthermore, in an attempt to improve the rate of cache hits, the read request to the memory can be provided as a burst request in order to obtain a full cache line of data rather than just the specifically requested data. A linefill buffer may be used to collect the data received in response to the burst request prior to updating the cache with the data. In this manner, a full cache line can be collected prior to updating the cache.

In many data processing systems, external memories are capable of handling multiple outstanding access requests and can provide read data in response to these access requests out of order. While additional linefill buffers may be used to collect cache line data for different cache lines, additional linefill buffers result in increased circuit area which is undesirable. Therefore, a need exists for a cache controller which is capable of handling multiple outstanding access requests, with either in or out of order return data, without expanding the number of linefill buffers.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, in response to multiple read requests from a central processing unit (CPU) which result in cache misses in the cache, multiple burst requests are provided by the cache controller to external memory. The burst requests can be generated to either allow in order or out of order data returns. Furthermore, only a single linefill buffer having a size necessary to store a single cache line of the cache is available for collecting data received from the burst request. Therefore, in one embodiment, the cache controller, in addition to providing the CPU the requested data in response to its multiple read requests (which corresponds to the critical beats returned for each burst request), also assigns ownership of the single linefill buffer to the collection of data corresponding to a single cache line corresponding to the burst request which returned its critical beat latest. In doing so, the cache controller may abort a cache line fill which was in progress for a previous incomplete burst access.

Figure 1:
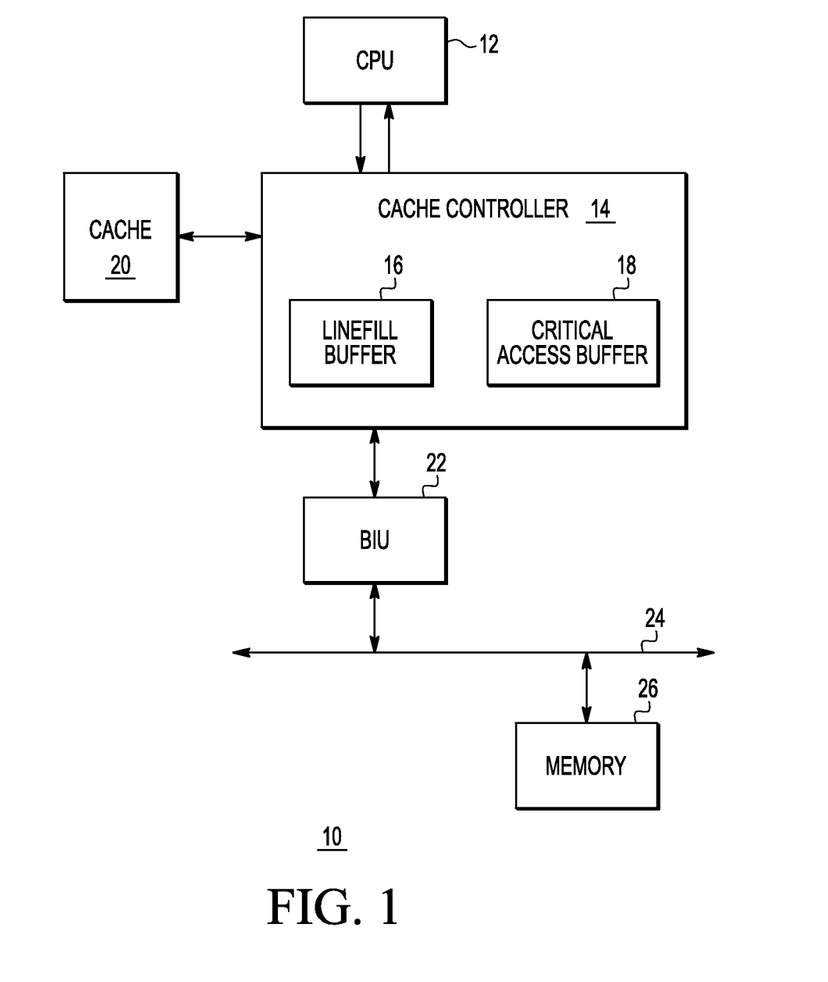
FIG. 1 illustrates, in block diagram form, a data processing system in accordance with one embodiment of the present invention.

FIG. 1 illustrates, in block diagram form, a data processing system 10 in accordance with one embodiment of the present inventions. System 10 includes a central processing unit (CPU) 12 (which may also be referred to as a processor), a cache 20, a cache controller 14, a bus interface unit (BIU) 22, a system interconnect 14, and a memory 26. Note that additional elements may be present in system 10, such as other caches, other memories, input/output (I/O) devices, or other peripherals. CPU 12 can be any type of processor and is bidirectionally coupled to cache controller 14. Cache controller 14 includes a linefill buffer 16 and a critical access buffer 18. Cache controller 14 is bidirectionally coupled to cache 20 and BIU 22. BIU 22 and memory 26 are each bidirectionally coupled to system interconnect 24.

In the illustrated embodiment, linefill buffer 16 is storage circuitry that is configured to hold, at most, only a single cache line of data. For example, each cache line of cache 20 may correspond to 4 doublewords, such that each cache line is 32 bytes. In this case, linefill buffer 16 is a single 32-byte buffer. Alternatively, the cache lines of cache 20 may be of a different size. In one embodiment, each cache line may be 8 doublewords, such that each cache line is 64 bytes. In this case, linefill buffer 16 is a single 64-byte buffer. Critical access buffer 18 is storage circuitry that is configured to hold a requested data element that has been requested by CPU 12. For example, in one embodiment, for a read request by CPU 12, a doubleword of data is returned. In this case, critical access buffer 18 may be a 8-byte buffer (i.e. 64-bit buffer).

In one embodiment, system interconnect 24 is a bus which operates in accordance with the AXI protocol. The AXI protocol is capable of accepting multiple outstanding burst requests from cache controller 14 and can return the data out of order. Memory 26 can be any type of memory and is typically slower to access as compared to cache 20. Memory 26 may also be referred to as an external memory or an external memory module. Furthermore, there may be other masters in system 10 (such as other peripherals) which may access memory 26 by way of bus 24.

In operation, CPU 12 is capable of making load or store (i.e. read or write) memory access requests to memory 26. For each memory access request, CPU 12 may provide an access address and control information to cache controller 14. Cache controller 14 then determines whether the access request hits or misses in cache 20. Note that in making the hit or miss determination, cache controller 14 also looks to linefill buffer 16 to determine if the current access request is within linefill buffer 16. If so, then a cache hit is still considered to occur. In the case of a cache miss, such as for a read access request, cache controller 14 provides a read access request, via BIU 22, to bus 24. Memory 26 can then process the access request and provide return data onto bus 24. In one embodiment, cache controller 14 provides the read access request as a burst read request to bus 14, in which each burst read request indicates a burst size. In one embodiment, the burst size corresponds to the number of burst elements corresponding to a cache line. Therefore, in the case of a cache line of cache 20 being 4 doublewords, cache controller can provide a burst read request of 4 doublewords, in which data is returned in 4 beats, each beat being one double word. Each burst access returns a critical beat (which corresponds to the data element requested by the CPU's original read request which resulted in the cache miss) and additional non-critical beats which are used to complete a full cache line for use in updating cache 20. Cache controller 20 receives the return beats and stores the data into linefill buffer 16. Once linefill buffer 16 completes a full cache line of data, cache controller 14 can update cache 20 with the entry stored in linefill buffer 16.

Figure 2:
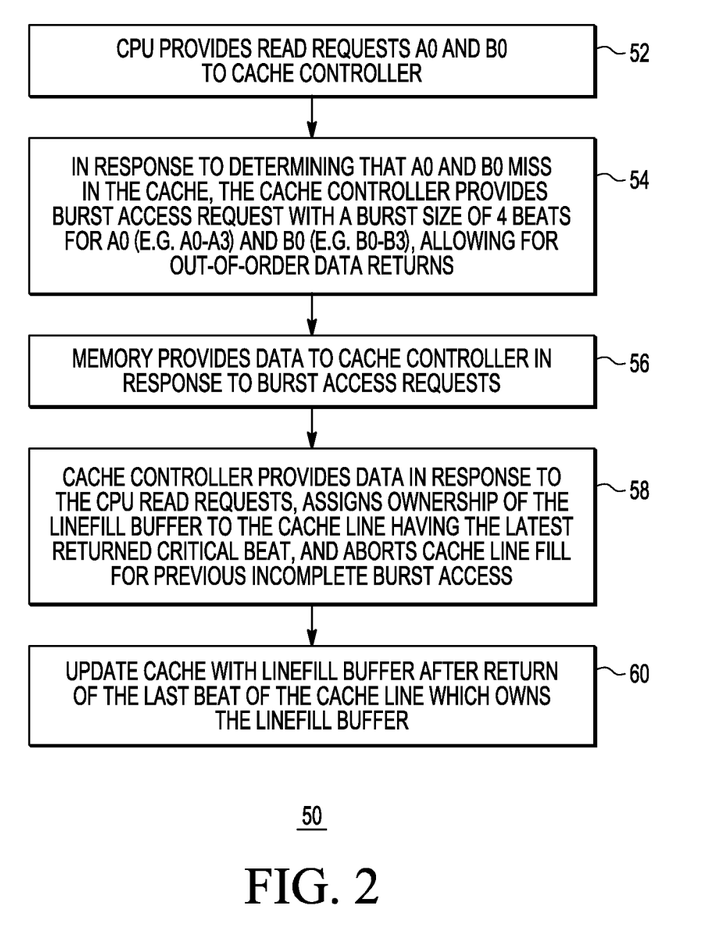
FIG. 2 illustrates, in flow diagram form, a method of processing read requests in accordance with one embodiment of the present invention.

In the illustrated embodiment, bus 24 operates in accordance with a protocol, such as the AXI protocol, which supports two outstanding burst requests in which the data can be returned out of order. Note that the AXI protocol, in other implementations, may support more than two outstanding burst requests. For example, CPU 12 may make a read request for data stored at address A0, and, before receiving the read data, may make another read request for data stored at address B0. This example will be described in more detail in reference to FIG. 2. FIG. 2 illustrates a method 50 for processing CPU read requests in accordance with one embodiment of the present invention. In block 52, CPU provides read requests for data at A0 and for data at B0 to cache controller 14. Cache controller 14 determines whether address A0 and address B0 result in a hit or miss in cache 20. If cache controller 14 determines that A0 results in a cache miss and B0 results in a cache miss, then cache controller 14 provides a burst access request with a burst size of 4 beats for each of A0 and B0. Therefore, for A0, the burst access request is for data elements stored at A0, A1, A2, and A3, in which the data element returned for A0 corresponds to the critical beat of the burst access and the data elements returned for A1-A3 correspond to the non-critical beats of the burst access. That is, the critical beat corresponds to the access address of the original read request made by CPU 12. Similarly, for B0, the burst access request is for data elements stored at B0, B1, B2, and B3, in which the data element returned for B0 corresponds to the critical beat of the burst access and the data elements returned for B1-B3 corresponds to the non-critical beats of the burst access.

In this example, each data element returned for a beat of the burst is a doubleword. Also, note that the burst access requests provided by cache controller 14 allows for either in order or out of order data returns. Furthermore, bus 24 supports multiple outstanding burst requests, therefore, burst requests for each of A0 and B0 can be placed onto bus 24 and the 4 returned data beats for each of these burst requests can be returned out of order. As used herein, out of order indicates that the data beats of different burst requests can be interleaved with each other; however, the data beats of each burst request are received in order. Furthermore, the burst protocol used by bus 24, such as the AXI protocol, returns the critical beat of each burst access first. The burst protocol used by bus 24 may also provide additional parameters for each burst access request. For example, it may define the size of each data element of a burst, which, in the current example, is a doubleword. Also, as used herein, A0-A3 refer to the 4 doublewords (i.e. the 4 data elements) of the cache line which includes critical beat A0 and thus referred to as cache line A, and B0-B3 refer to the 4 doublewords (i.e. the 4 data elements) of the cache line which includes critical beat B0 and thus referred to as cache line B.

Referring to FIG. 2, in block 56, memory 26 provides 4 data beats in response to each burst access request via bus 24 to cache controller 14. In block 58, cache controller 14 provides the data of the critical beats to CPU 12 since these correspond to the read requests made by CPU 12 and should therefore be returned as quickly as possible to CPU 12. Note one of the returned critical beats may be stored in critical access buffer 18. In the illustrated embodiment, CPU 12 can only receive critical beats in order. Therefore, a critical beat that is received out of order can be stored in critical access buffer 18 until CPU 12 can accept it. Cache controller 14 also collects the returned data beats in linefill buffer 16. However, linefill buffer 16 is only sufficiently large to store one cache line of data, therefore, cache controller is unable to store all 4 returned beats of both burst access requests. In one embodiment, cache controller 14 assigns ownership of linefill buffer 16 to the cache line having the latest returned critical beat. Therefore, if the critical beat corresponding to B0 comes in after the critical beat corresponding to A0, then ownership of linefill buffer 16 is assigned to the burst access for B0, such that B0-B3 get stored into linefill buffer 16. Note that upon receiving a first critical beat, such as for A0 in this example, cache controller 16 may assign ownership to the burst access for A0 and thus store the data corresponding to A0 to linefill buffer 16. However, if subsequent to receiving the data for A0, the data for B0 is received, cache controller 14 aborts the cache line fill in progress for the burst access for A0 in favor of the burst access for B0.

After block 58, method 50 proceeds to block 60 in which cache 20 is updated with linefill buffer 16 after the last beat of the cache line which owns the linefill buffer is received. Therefore, in the case of ownership belonging to the burst access for B0, once B3 is received, linefill buffer 16 is written to cache 20 and linefill buffer 16 is once again available. Therefore, note that if each of A0-A3 is received prior to receiving B0, then the cache line with A0-A3 will be written to cache 20 prior to filling linefill buffer 16 with the burst access for B0.

Figure 3:
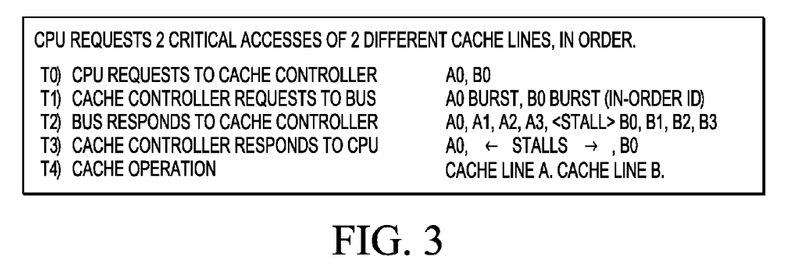
FIGS. 3-5 illustrate, in diagrammatic form, various examples of handling read requests in accordance with embodiments of the present invention.
Figure 4:
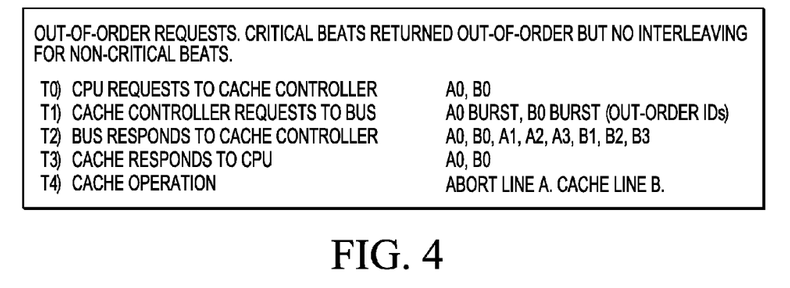
Figure 5:
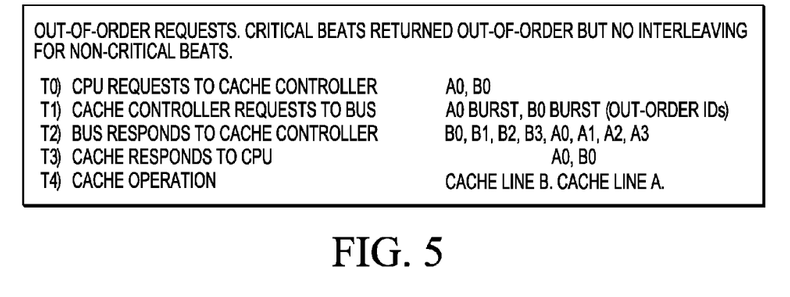

FIGS. 3-5 illustrate various examples of handling read requests. Note that for each of FIGS. 3-5, actions are provided at different times, T0-T4, in which these times may occur in sequential order, but may overlap with previous or subsequent times.

FIG. 3 illustrates an example in which CPU 12 requests 2 critical access of 2 different cache lines with an in order return of data elements. Therefore, at time T0, CPU 12 provides a read request to cache controller 20 for data stored at each of A0 and B0. At time T1, cache controller 14 generates a burst read access request for each of A0 and B0. Therefore, in the illustrated example, the burst read access request for A0 requests A0-A3, and the burst read access request for B0 requests B0-B3. Since bus 24 is capable of handling two outstanding read access requests, both burst read access requests are provided to bus 24 by way of BIU 22. Memory 26 receives the burst read access requests to obtain the return data beats.

At time T2, memory 26 begins placing the return data beats onto bus 24 to be returned to cache controller 14 by way of BIU 22. Therefore, memory 26 can place the data beat for A0 (i.e. the data elements stored at A0) onto bus 24. Since the burst access requests are indicated as in order requests, all of the data beats for burst access A are placed onto bus 24 prior to any of the data beats for burst access B. Therefore, the data beats for A1, A2, and A3 follow A0 on bus 24. Bus 24 provides these return data beats to cache controller 14 by way of BIU 22. After the last data beat of the burst access for A is provided to bus 24, memory 26 can begin providing the data beats for the burst access for B. However, note that a stall may be incurred between the last data beat of the burst access for A and the first data beat of the burst access for B. Memory 26 then places each of B0, B1, B2, and B3 onto bus 24, which communicates these return beats to cache controller 14 by way of BIU 22.

At time T3, cache controller 14, upon receiving the data element for A0 provides this data element to CPU 12, and stores the data element for A0 into linefill buffer 16. Each subsequent data element for the burst access for A is also collected into linefill buffer 16, and, upon receiving the last element, A3, cache controller 14 updates cache 20 with the cache line of linefill buffer 16. Also, upon receiving the data element for B0, cache controller 14 provides this data element to CPU 12, and stores the data element for B0 into linefill buffer 16. Each subsequent data element for the burst access for B is also collected into linefill buffer 16, and upon receiving the last element, B3, cache controller 14 updates cache 20 with the cache line of linefill buffer 16. Therefore, in FIG. 3, time T4 corresponds to the time at which the resulting cache operations are performed for each burst access. That is, after collecting all data elements for the burst access for A into linefill buffer 16, the cache line for this access (denoted as cache line A) can be stored to cache 20, and after collecting all data elements for the burst access for B into linefill buffer 16, the cache line for this access (denoted as cache line B) can be stored to cache 20.

FIG. 4 illustrates an example in which CPU 12 requests 2 critical access of 2 different cache lines with an out of order return of data elements. Therefore, at time T0, CPU 12 provides a read request to cache controller 20 for data stored at each of A0 and B0. At time T1, cache controller 14 generates a burst read access request for each of A0 and B0. Therefore, in the illustrated example, the burst read access request for A0 requests A0-A3, and the burst read access request for B0 requests B0-B3. Since bus 24 is capable of handling two outstanding read access requests, both burst read access requests are provided to bus 24 by way of BIU 22. Furthermore, each burst read access request is indicated as an out-of-order request in which the data beats of the two burst requests can be returned in an interleaved manner. Memory 26 receives the burst read access requests to obtain the return data beats.

At time T2, memory 26 begins placing the return data beats onto bus 24 to be returned to cache controller 14 by way of BIU 22. Therefore, memory 26 can place the data beat for A0 (i.e. the data element stored at A0) onto bus 24. Since the burst access requests may be returned out of order, memory 26 may place the data beat for B0 onto bus 24 prior to the data beat for A1. In the illustrated embodiment, the data beats are placed onto bus 24 in the following order: A0, B0, A1, A2, A3, B1, B2, and B3. Bus 24 provides these return data beats to cache controller 14 by way of BIU 22.

At time T3, cache controller 14, upon receiving the data element for A0 provides this data element to CPU 12, and stores the data element for A0 into linefill buffer 16. That is, cache controller 14 initially assigns linefill buffer 16 to the burst access for A. Since B0, which is also a critical beat, is received after A0, cache controller 14, upon receiving the data element for B0, provides this data element to CPU 12, and stores the data element for B0 into linefill buffer 16, replacing the data element for A0. Therefore, cache controller 14 re-assigns the ownership of linefill buffer 16 from the burst access for A to the burst access for B. The linefill in progress for the burst access for A is thus aborted and the cache line corresponding to burst access A will not be completed. As cache controller 14 receives B1, B2, and B3, cache controller 14 stores these into linefill buffer 16, and upon storing the final data element of the burst, B3, the cache line for this burst access (denoted as cache line B) will be stored to cache 20. Note that data elements A1, A2, and A3 are not stored in linefill buffer 16 since ownership of linefill buffer 16 was assigned to the burst access for B. Therefore, in FIG. 4, time T4 corresponds to the time at which the resulting cache operations are performed for each burst access. Since ownership was changed from the cacheline for A to the cacheline for B, the cache line for A is aborted and thus cache 20 is not updated with the burst access for A. However, after collecting all data elements for the burst access for B into linefill buffer 16, the cache line for this access is stored to cache 20.

Therefore, note that as seen in the example of FIG. 3, ownership of linefill buffer 16 is assigned to the first burst request (the burst access for A) when this first burst request is fulfilled before any data elements for the second burst request (the burst access for B) are received. That is, in the example of FIG. 3, ownership of linefill buffer 16 need not be re-assigned to a different burst request while a previous burst request is in progress. Therefore, if all data elements of the first burst access for A0 are received from memory 26 before any of the data elements of the second burst access for B0 are received, the data elements of the first burst access for A0 (e.g. A0-A3) can all be stored in linefill buffer 16 and then stored to cache 20. However, as seen in the example of FIG. 4, ownership of linefill buffer 16 is assigned to the second burst request when a data element of the second burst request (e.g. B0) is received after the first data element (e.g. A0) is received but before all the data elements for the first burst request (e.g. A0-A3) are received. In this example, ownership of linefill buffer 16 is re-assigned while a cache line fill of the previous burst access is in progress, resulting in aborted this cache line fill of the previous burst access. Therefore, if any of the data elements of the second burst access for B0 are received after at least one of A0, A1, or A2 but before the last element, A3, then the data elements of the second burst access for B0 (e.g. B0-B3) are stored in linefill buffer 16 rather than the data elements of the first access for A0.

FIG. 5 illustrates an example in which CPU 12 requests 2 critical access of 2 different cache lines with an out of order return of data elements. Therefore, at time T0, CPU 12 provides a read request to cache controller 20 for data stored at each of A0 and B0. At time T1, cache controller 14 generates a burst read access request for each of A0 and B0. Therefore, in the illustrated example, the burst read access request for A0 requests A0-A3, and the burst read access request for B0 requests B0-B3. Since bus 24 is capable of handling two outstanding read access requests, both burst read access requests are provided to bus 24 by way of BIU 22. Furthermore, each burst read access request is indicated as an out-of-order request in which the data beats of the two burst requests can be returned in an interleaved manner. Memory 26 receives the burst read access requests to obtain the return data beats.

At time T2, memory 26 begins placing the return data beats onto bus 24 to be returned to cache controller 14 by way of BIU 22. In the current example, since the data beats may be returned out of order, memory 26 places the data beat for B0 (i.e. the data element stored at B0) onto bus 24 prior to the data beat for A1. In the illustrated embodiment, the data beats are placed onto bus 24 in the following order: B0, B1, B2, B3, A0, A1, A2, and A3. Bus 24 provides these return data beats to cache controller 14 by way of BIU 22. Note that each of A0 and B0 correspond to the critical beats and thus may be stored by cache controller 14 into critical access buffer 18. In this manner, although the critical beats are received out of order with respect to the requests, cache controller 14 may still provide the critical beats in correct order to CPU 12. When cache controller 14 receives B0, cache controller 14 stores B0 into linefill buffer 16 as well as critical access buffer 18. Therefore, ownership of linefill buffer 16 is provided to the burst access for B. Upon receiving each of B1, B2, and B3, each is stored into linefill buffer 16, and after receiving the last element, B3, the cache line in linefill buffer 16, corresponding to the burst access for B, is stored to cache 20. Upon cache controller 14 receiving A0, cache controller 14 stores A0 into linefill buffer 16 (which is no longer being used for the burst access for B) and provides A0 to CPU 12. Note that after A0 is accepted by CPU 12, B0 can be provided to CPU 12 from critical access buffer 18. In this manner, A0 and B0 are provided in order to CPU 12. Ownership of linefill buffer 16 is therefore now provided to the burst access for A. However, no cache line fill of linefill buffer 16 had to be aborted in this example since all of B0-B3 was received into linefill buffer 16 before a new critical beat, A0, was received. Each subsequently received data element A1, A2, and A3 are stored to linefill buffer 16, and upon cache controller 14 receiving the last element, A3, the cache line in linefill buffer 16, corresponding to the burst access for A, is stored to cache 20.

At time T3, cache controller 14 can first provide A0 to CPU 12 and then subsequently provide B0 to CPU 12. In this manner, A0 and B0 are still provided in the correct order to CPU 12. They may be provided from critical access buffer 18. Also, in FIG. 5, time T4 corresponds to the time at which the resulting cache operations are performed for each burst access. That is, after collecting all data elements for the burst access for B into linefill buffer 16, the cache line for this access (denoted as cache line B) can be stored to cache 20, and after collecting all data elements for the burst access for A into linefill buffer 16, the cache line for this access (denoted as cache line A) can be stored to cache 20.

Therefore, by now it can be appreciated how a cache controller and a single linefill buffer capable of storing only a single cache line of data can be used with a bus which is capable of handling more than one outstanding request, which may be in or out of order. Upon receiving a first critical beat, ownership of the linefill buffer can be assigned to the cache line fill for the first critical beat. However, if a subsequent critical beat for another burst access is received prior to completing the previous cache line fill of the linefill buffer, ownership of the linefill buffer can be changed to the subsequent cache line (i.e. the cache line having the latest returned critical beat), thus aborting the cache line fill that was in progress. In this manner, multiple access requests can be returned out of order while still making use of the linefill buffer to collect data for one cache line at a time.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also for example, in one embodiment, the illustrated elements of system 10 are circuitry located on a single integrated circuit or within a same device. Alternatively, system 10 may include any number of separate integrated circuits or separate devices interconnected with each other.

Although the invention is described herein with reference to specific embodiments, various modifications and changes can be made without departing from the scope of the present invention as set forth in the claims below. For example, cache 20 may be different types of caches. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system having a central processing unit (CPU); an external memory module; a cache controller coupled to communicate with the CPU and the external memory unit, the cache controller including a linefill buffer; and a cache memory module coupled to the cache controller. The cache controller is configured to: when data in a first request and in a second request from the CPU does not reside in the cache memory module: request first and second data elements from the external memory module in response to the first request from the CPU; request first and second data elements from the external memory module in response to the second request from the CPU, wherein the first data element responsive to the second request is received by the cache controller from the external memory module after the first data element responsive to the first request and before the second data element responsive to the first request; assign ownership of the linefill buffer to the first request when the first data element responsive to the first request is received; re-assign ownership of the linefill buffer to the second request when the first data element responsive to the second request is received after the first data element responsive to the first request is received. Item 2 includes the processing system of item 1, wherein the cache controller is further configured to: fill the linefill buffer with the first and second data elements responsive to the first request when the ownership of the linefill buffer is assigned to the first request; fill the linefill buffer with the first and second data elements responsive to the second request when the ownership of the linefill buffer is assigned to the second request; and update the cache memory module with contents of the linefill buffer. Item 3 includes the processing system of item 1, wherein the cache controller is further configured to: when the first and second data elements for the first request are received before the first data element for the second request and the first request is complete, retain the ownership of the linefill buffer with the first request. Item 4 includes the processing system of item 1, wherein the cache controller is further configured to: when the first and second data elements for the second request are received before the first data element for the first request and the second request is complete, assign the ownership of the linefill buffer to the second request. Item 5 includes the processing system of item 1, wherein the cache controller is further configured to: issue a first burst request for at least the first and second data elements for the first request; and issue a second burst request for at least the first and second data elements for the second request. Item 6 includes the processing system of item 5, wherein the cache controller is further configured to: assign the ownership of the linefill buffer to the first request when the first burst request is fulfilled before any data elements for the second burst request are received. Item 7 includes the processing system of item 5, wherein the cache controller is further configured to: assign the ownership of the linefill buffer to the second request when any data element responsive to the second request is received after the first data element for the first request is received and before all data elements for the first request are received. Item 8 includes the processing system of item 1, wherein the cache memory module includes a plurality of cache lines; and the linefill buffer stores only one cache line.

Item 9 includes a processing system having: a central processing unit (CPU); an external memory module; a cache memory module; and a cache controller coupled to communicate with the CPU, the external memory module and the cache memory module. The cache controller is configured to: in response to determining that a first data element responsive to a first request from the CPU and a second data element responsive to a second request from the CPU are not in the cache memory module and the first and second data elements are not in a same cache line: issue a first burst access request to the external memory for the first request; issue a second burst access request to the external memory for the second request; receive at least one of a plurality of first data elements from the external memory in response to the first burst access request; receive at least one of a plurality of second data elements from the external memory in response to the second burst access request; store the plurality of first data elements in a linefill buffer if all of the plurality of first data elements are received from the external memory before the at least one of the plurality of second data elements are received from the external memory; store the plurality of second data elements in the linefill buffer if any of the plurality of second data elements are received after the at least one of the plurality of first data elements is received and before all of the plurality of first data elements are received. Item 10 includes the processing system of item 9, wherein: the cache memory module includes a plurality of cache lines; the linefill buffer can store only one cache line; the plurality of first data elements fill the one cache line; the plurality of second data elements fill the one cache line. Item 11 includes the processing system of item 9, wherein the cache controller is further configured to: update the cache memory module with contents of the linefill buffer. Item 12 includes the processing system of item 9 wherein the cache controller is further configured to: abort the update of the cache memory module with the plurality of first data elements when any of the plurality of second data elements are received after the at least one of the plurality of first data elements is received and before all of the plurality of first data elements are received. Item 13 includes the processing system of item 12 wherein the cache controller is further configured to: complete processing the first and second request when all of the plurality of first data elements are received before any of the plurality of second data elements. Item 14 includes the processing system of item 12 wherein the cache controller is further configured to: complete processing the first and second request when all of the plurality of second data elements are received before any of the plurality of first data elements. Item 15 includes the processing system of item 12 wherein the cache controller is further configured to: provide the at least one of the first of the first plurality of data elements to the CPU; and update the cache memory module with the first plurality of data elements when the first request has not been aborted. Item 16 includes the processing system of item 9 and further includes a critical access buffer accessible by the cache controller; wherein the cache controller is further configured to: store a critical one of the second plurality of data elements in the critical access buffer when a critical one of the first plurality of data elements is received after the critical one of the second plurality of data elements and before all of the plurality of second date elements are received. Item 17 includes the processing system of item 16 wherein the cache controller is further configured to: store the critical one of the second plurality of data elements in the critical access buffer in the linefill buffer along with remaining ones of the second plurality of data elements after the first plurality of data elements are provided to the cache memory module.

Item 18 includes a method including receiving a first request for data from a central processing unit; receiving a second request for data from a central processing unit; when neither of the data of the first request and the data of the second request reside in cache memory: issuing a first burst access request for a first plurality of data elements that includes the data of the first request, issuing a second burst access request for a second plurality of data elements that includes the data of the second request, the first and second burst access requests being sent from a cache controller to an external memory unit; receiving a critical one of the first plurality of data elements in the cache controller; storing the critical one of the first plurality of data elements in a linefill buffer; receiving a critical one of the second plurality of data elements in the cache controller after receiving the critical one of the first plurality of data elements; replacing the critical one of the first plurality of data elements in the linefill buffer with the critical one of the second plurality of data elements; filling remaining space in the linefill buffer with remaining ones of the second plurality of data elements; providing contents of the linefill buffer to the cache memory module when the linefill buffer is filled. Item 19 includes the method of item 18 and further includes providing the critical one of the first plurality of data elements to the CPU; and providing the critical one of the second plurality of data elements to the CPU. Item 20 includes the method of item 18 and further includes storing the critical one of the second plurality of data elements in a critical access buffer when a critical one of the first plurality of data elements is received after the critical one of the second plurality of data elements and before all of the plurality of second date elements are received.

What is claimed is:

1. A data processing system comprising:
a central processing unit (CPU);
an external memory module;
a cache controller coupled to communicate with the CPU and the external memory unit, the cache controller including a linefill buffer;
a cache memory module coupled to the cache controller, wherein the cache controller is configured to:
when data in a first request and in a second request from the CPU does not reside in the cache memory module:
request first and second data elements from the external memory module in response to the first request from the CPU;
request first and second data elements from the external memory module in response to the second request from the CPU, wherein the first data element responsive to the second request is received by the cache controller from the external memory module after the first data element responsive to the first request and before the second data element responsive to the first request;
assign ownership of the linefill buffer to the first request when the first data element responsive to the first request is received;
re-assign ownership of the linefill buffer to the second request when the first data element responsive to the second request is received after the first data element responsive to the first request is received.

2. The processing system of claim 1, wherein:
the cache controller is further configured to:
fill the linefill buffer with the first and second data elements responsive to the first request when the ownership of the linefill buffer is assigned to the first request;
fill the linefill buffer with the first and second data elements responsive to the second request when the ownership of the linefill buffer is assigned to the second request; and
update the cache memory module with contents of the linefill buffer.

3. The processing system of claim 1 wherein the cache controller is further configured to:
when the first and second data elements for the first request are received before the first data element for the second request and the first request is complete, retain the ownership of the linefill buffer with the first request.

4. The processing system of claim 1 wherein the cache controller is further configured to:
when the first and second data elements for the second request are received before the first data element for the first request and the second request is complete, assign the ownership of the linefill buffer to the second request.

5. The processing system of claim 1 wherein the cache controller is further configured to:
issue a first burst request for at least the first and second data elements for the first request; and
issue a second burst request for at least the first and second data elements for the second request.

6. The processing system of claim 5 wherein the cache controller is further configured to:
assign the ownership of the linefill buffer to the first request when the first burst request is fulfilled before any data elements for the second burst request are received.

7. The processing system of claim 5 wherein the cache controller is further configured to:
assign the ownership of the linefill buffer to the second request when any data element responsive to the second request is received after the first data element for the first request is received and before all data elements for the first request are received.

8. The processing system of claim 1 wherein
the cache memory module includes a plurality of cache lines; and
the linefill buffer stores only one cache line.

9. A processing system comprising:
a central processing unit (CPU);
an external memory module;
a cache memory module;
a cache controller coupled to communicate with the CPU, the external memory module and the cache memory module, the cache controller is configured to:
in response to determining that a first data element responsive to a first request from the CPU and a second data element responsive to a second request from the CPU are not in the cache memory module and the first and second data elements are not in a same cache line:
issue a first burst access request to the external memory for the first request;
issue a second burst access request to the external memory for the second request;
receive at least one of a plurality of first data elements from the external memory in response to the first burst access request;
receive at least one of a plurality of second data elements from the external memory in response to the second burst access request;
store the plurality of first data elements in a linefill buffer if all of the plurality of first data elements are received from the external memory before the at least one of the plurality of second data elements are received from the external memory;
store the plurality of second data elements in the linefill buffer if any of the plurality of second data elements are received after the at least one of the plurality of first data elements is received and before all of the plurality of first data elements are received.

10. The processing system of claim 9 wherein:
the cache memory module includes a plurality of cache lines;
the linefill buffer can store only one cache line;
the plurality of first data elements fill the one cache line;

the plurality of second data elements fill the one cache line.

11. The processing system of claim 9, wherein the cache controller is further configured to:
   update the cache memory module with contents of the linefill buffer.

12. The processing system of claim 9 wherein the cache controller is further configured to:
   abort the update of the cache memory module with the plurality of first data elements when any of the plurality of second data elements are received after the at least one of the plurality of first data elements is received and before all of the plurality of first data elements are received.

13. The processing system of claim 12 wherein the cache controller is further configured to:
   complete processing the first and second request when all of the plurality of first data elements are received before any of the plurality of second data elements.

14. The processor of claim 12 wherein the cache controller is further configured to:
   complete processing the first and second request when all of the plurality of second data elements are received before any of the plurality of first data elements.

15. The processor of claim 12 wherein the cache controller is further configured to:
   provide the at least one of the first of the first plurality of data elements to the CPU; and
   update the cache memory module with the first plurality of data elements when the first request has not been aborted.

16. The processor of claim 9 further comprising:
   a critical access buffer accessible by the cache controller;
   wherein the cache controller is further configured to:
      store a critical one of the second plurality of data elements in the critical access buffer when a critical one of the first plurality of data elements is received after the critical one of the second plurality of data elements and before all of the plurality of second date elements are received.

17. The processor of claim 16 wherein the cache controller is further configured to:
   store the critical one of the second plurality of data elements in the critical access buffer in the linefill buffer along with remaining ones of the second plurality of data elements after the first plurality of data elements are provided to the cache memory module.

18. A method comprising:
   receiving a first request for data from a central processing unit;
   receiving a second request for data from a central processing unit;
   when neither of the data of the first request and the data of the second request reside in cache memory:
      issuing a first burst access request for a first plurality of data elements that includes the data of the first request,
      issuing a second burst access request for a second plurality of data elements that includes the data of the second request, the first and second burst access requests being sent from a cache controller to an external memory unit;
      receiving a critical one of the first plurality of data elements in the cache controller;
      storing the critical one of the first plurality of data elements in a linefill buffer;
      receiving a critical one of the second plurality of data elements in the cache controller after receiving the critical one of the first plurality of data elements;
      replacing the critical one of the first plurality of data elements in the linefill buffer with the critical one of the second plurality of data elements;
      filling remaining space in the linefill buffer with remaining ones of the second plurality of data elements;
      providing contents of the linefill buffer to the cache memory module when the linefill buffer is filled.

19. The method of claim 18 further comprising:
   providing the critical one of the first plurality of data elements to the CPU; and
   providing the critical one of the second plurality of data elements to the CPU.

20. The method of claim 18 further comprising:
   storing the critical one of the second plurality of data elements in a critical access buffer when a critical one of the first plurality of data elements is received after the critical one of the second plurality of data elements and before all of the plurality of second date elements are received.

* * * * *